H. P. Jones,
Bread Machine.

N° 61,206. Patented Jan. 15, 1867.

Witnesses:

Inventor:
H. P. Jones

United States Patent Office.

H. P. JONES, OF DAVENPORT, IOWA.

Letters Patent No. 61,206, dated January 15, 1867.

---

IMPROVED DOUGH-KNEADER.

---

*The Schedule referred to in these Letters Patent and making part of the same.*

---

TO ALL WHOM IT MAY CONCERN:

Be it known that I, H. P. JONES, of Davenport, in the county of Scott, and State of Iowa, have invented a new and improved Machine for Kneading Dough; and I do hereby declare that the following is a full, clear, and exact description thereof, reference being had to the accompanying drawings, making a part of this specification, in which—

Similar letters of reference indicate corresponding parts in the several figures.

This invention relates to a new and improved machine, which is designed for kneading dough, and which may also be successfully employed for washing, salting, and working butter.

The invention consists in the use of a double-bevelled or tapering blade, having bevelled ends, in conjunction with a trough or box having flaring sides and ends, said blade being applied to its box in such manner that it receives when in operation a rolling or travelling movement back and forth, from one end of the box to the other, thereby pressing and cutting the dough, and mixing it in a more perfect manner than can be done by corrugated rollers, which have been hitherto employed for this purpose, as will be hereinafter described.

To enable others skilled in the art to understand my invention, I will describe its construction and operation.

Figure 1:
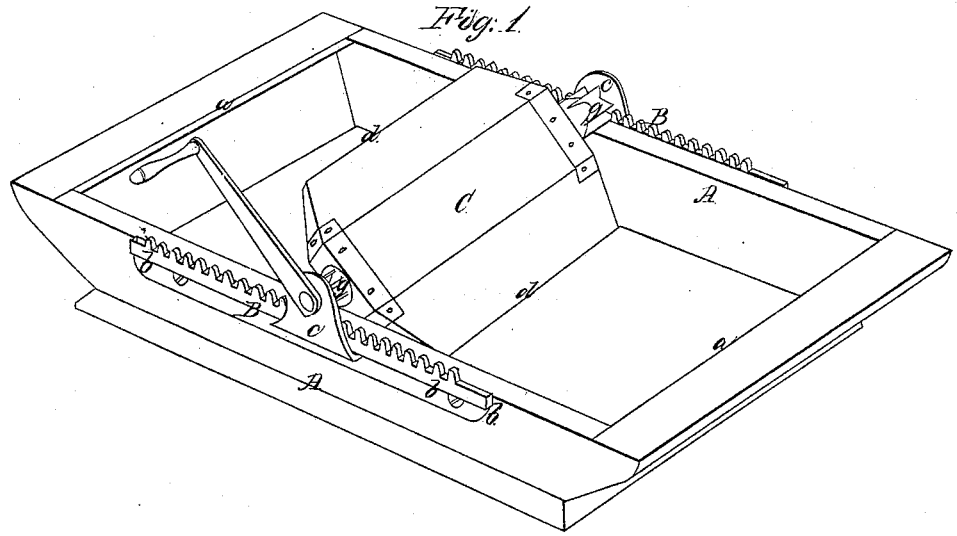
Figure 1 is a perspective view of the improved dough-kneader.
Figure 2:
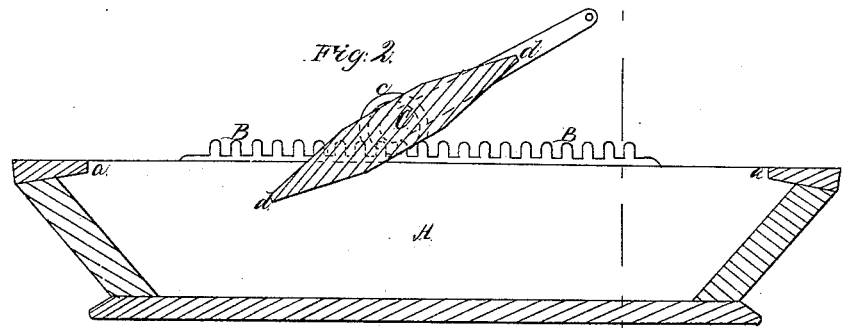
Figure 2 is a longitudinal section, taken centrally through the machine.
Figure 3:
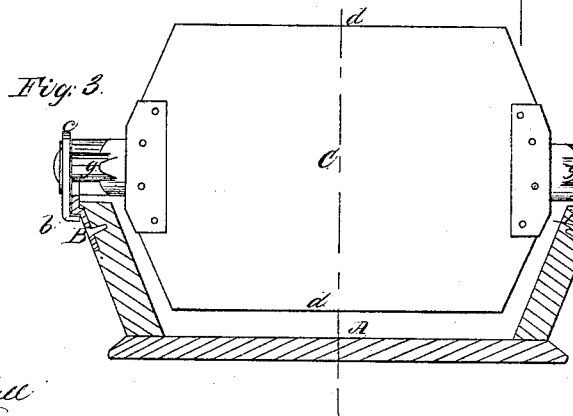
Figure 3 is a vertical transverse section through the same.

In the accompanying drawings, A represents a rectangular oblong trough or box, which is made with flaring sides and ends, and with overhanging strips, *a a*, at its ends for the purpose of preventing the escape of any fluid substances from the box at these points. On the outside of the longitudinal sides of the box A, and secured firmly thereto, are rack-plates, B B, the teeth of which project above the upper edges of said sides, as clearly shown in the drawings, so as to engage with the teeth which are formed on the gudgeons of the rotary blade C. These rack-plates are made with shoulders, *b b*, for receiving under them the sliding keepers *c c*, in which the gudgeons of the rotary blade C have their bearings. The length of the racks B B may be slightly greater than the length of travel of the blade C, allowing a space at the terminus of the rack for the removal of the blade C, when required. This blade is constructed with tapering or bevelled edges, *d d*, and with its ends bevelled, as shown in fig. 1. The parallel edges of the blade are bevelled or made thin in order to prevent these edges from liability of carrying up the dough with them; being inclined or bevelled, as shown, the dough will not readily adhere to them and be tossed up out of the box. The bevelled ends of the blade C conform to the inclined sides of the box A. When this blade is in the position shown in fig. 3, and as the blade approaches a horizontal position, the spaces between the sides of the box and ends of the blade increase, thus allowing the material which is being worked to let go of the blade. With a square-cornered blade and a box with perpendicular sides, the material would be carried around with the blade or thrown out of the box, but with a blade of the hexagonal shape shown, this will not be the case. The gudgeons *g g* are secured in a suitable manner to the middle of the ends of the blade C, and are constructed with teeth upon them, which engage with the teeth on the rack-plates B, as shown. The ends of the gudgeons *g g* are passed through the sliding keepers *c c*, so as to revolve freely; and on one end of one of the gudgeons, *g*, a crank-handle is secured, by turning which the blade C will be caused to revolve, and at the same time roll along upon the racks. When the blade C is in this manner rolled to one end of the box A, its motion is reversed, and it is rolled back again. By the action of the blade C upon the dough or butter put in box A, the substance is pressed into thin slices, lying one upon another, and at every passage of the blade from one end to the other of the box, the slices are subdivided, pressed down, and mixed one into the other; thus every part of the substance can be thoroughly and expeditiously kneaded.

Having described my invention, what I claim as new, and desire to secure by Letters Patent, is—

1. The employment of a traversing rotating blade of a hexagonal form, in conjunction with a box, A, having flaring sides and ends, substantially as described and for the purposes set forth.

2. The construction of the blade C, with toothed gudgeons *g g* on its ends, in combination with the sliding keepers *c c* and shouldered rack-plates B B, substantially as and for the purposes described.

H. P. JONES.

Witnesses:
DAN. H. SEVERANCE,
L. J. CENTER.